United States Patent
Wolf et al.

[11] Patent Number: 5,275,890
[45] Date of Patent: Jan. 4, 1994

[54] GUN TARGET WITH CONTRASTING BACKING

[76] Inventors: C. Steven Wolf, 102 Harold Rd.;
David Mucci, 25 Penfield Pl., both of
Farmington, Conn. 06032

[21] Appl. No.: 766,755

[22] Filed: Sep. 27, 1991

Related U.S. Application Data

[63] Continuation-in-part of Ser. No. 524,436, May 17, 1990, abandoned.

[51] Int. Cl.⁵ .......................... F41J 5/02; B32B 27/00; B32B 29/00
[52] U.S. Cl. .................................. 428/514; 428/535; 428/511; 428/537.5; 428/195; 273/181 B; 273/181 R; 273/408; 273/409
[58] Field of Search ............... 428/535, 500, 690, 503, 428/511, 518, 532, 537.5, 195, 213, 332, 220, 514; 273/181

[56] References Cited

U.S. PATENT DOCUMENTS

| | | | |
|---|---|---|---|
| 1,485,089 | 2/1924 | Musselman | 273/181 |
| 3,677,546 | 7/1972 | Oetiker | 273/102.2 R |
| 3,873,390 | 3/1975 | Cornell et al. | 156/230 |
| 4,460,426 | 7/1984 | Saito | 156/277 |
| 4,810,561 | 3/1989 | King | 428/195 |

Primary Examiner—Ellis P. Robinson
Assistant Examiner—Charles R. Nold
Attorney, Agent, or Firm—Chilton, Alix & Van Kirk

[57] ABSTRACT

A gun target including a substantially planar first sheet having a back surface and an exposed front surface which carries a graphic pattern having a first color, at which the weapon is aimed. A substantially planar second sheet is connected to the back surface of the first sheet so as to lie substantially parallel to the first sheet. The second sheet has a front surface that has a second, contrasting color relative to the first color. When a round fired from the weapon into the graphic pattern penetrates both sheets, the resulting hole exposes the second color at the front surface of the first sheet.

3 Claims, 1 Drawing Sheet

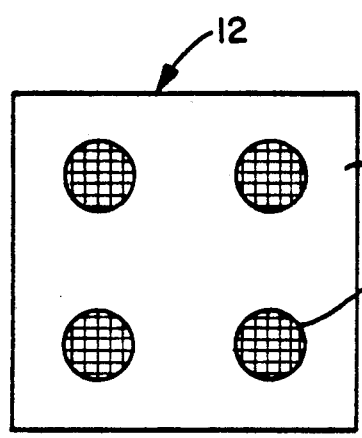
Fig. 1
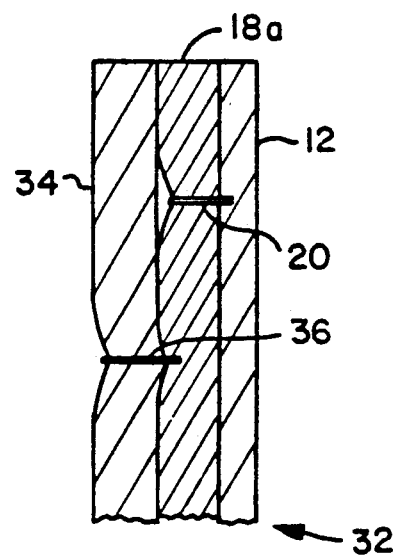
Fig. 8
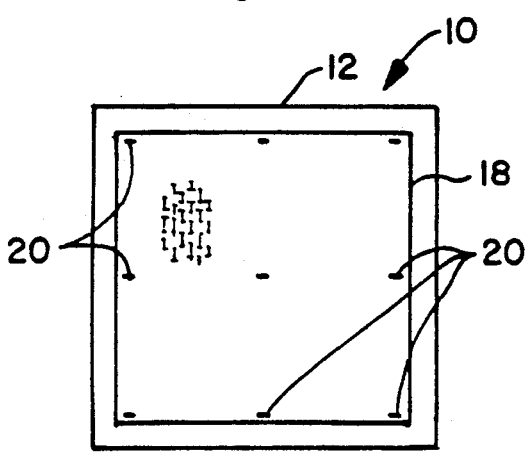
Fig. 2
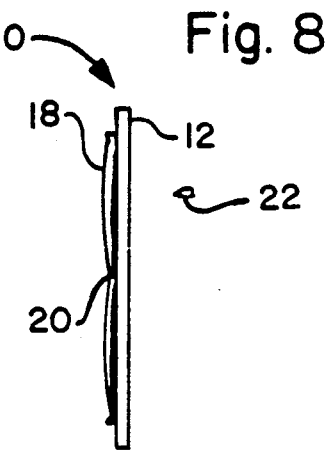
Fig 3
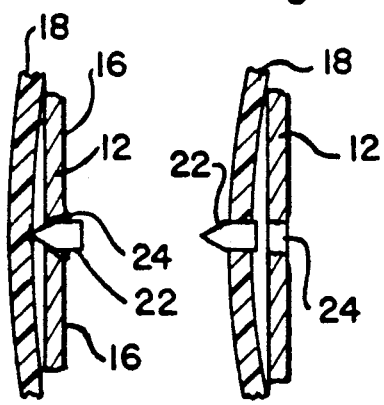
Fig. 4   Fig. 5
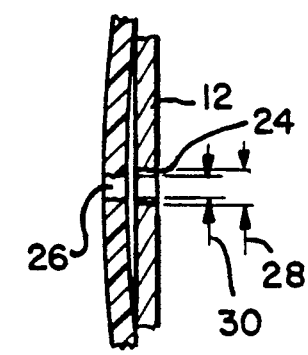
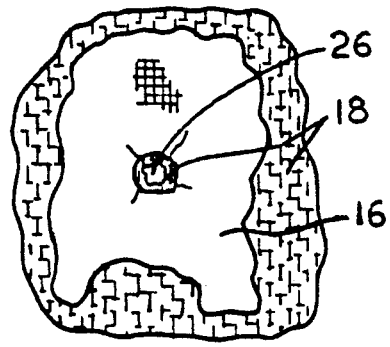
Fig. 6   Fig. 7

5,275,890

GUN TARGET WITH CONTRASTING BACKING

RELATED PATENT APPLICATIONS

This patent application is a continuation-in-part of U.S. Ser. No. 07/524,436, "Fluorescent Backing For Gun Targets", filed May 17, 1990, now abandoned, the disclosure of which is hereby incorporated by reference.

BACKGROUND OF THE INVENTION

The present invention relates to gun targets, and more particularly to small arms disposable targets.

The typical target for practice or competition in the shooting of small arms such as pellet guns, hand guns, and rifles, consists of a sheet of heavy paper on which one or more graphics patterns is printed, e.g., with a so-called "bulls-eye" or the like. Under many conditions of lighting or background behind the target, the hole produced by the fired round is difficult to visualize at a distance. Especially with a pellet or small caliber bullet, the hole in the paper partly re-closes. As a result, the marksman cannot, without seeing the holes, accurately adjust his aim.

SUMMARY OF THE INVENTION

It is an object of the present invention to provide a target that improves the visibiity of the holes caused by the penetration of the round through the target.

This is accomplished by providing a target including a substantially planar first sheet having a back surface and an exposed front surface which carries a graphic pattern having a first color, at which the weapon is aimed. A substantially planar second sheet is connected to the back surface of the first sheet so as to lie substantially parallel to the first sheet. The second sheet has a front surface that has a second, contrasting color relative to the first color. When a round fired from the weapon into the graphic pattern penetrates both sheets, the resulting hole exposes the second color at the front surface of the first sheet.

In one embodiment, the second sheet is fluorescent paper, preferably secured to a first sheet of paper.

In another embodiment, the first sheet is paper and the second sheet is a plastic.

BRIEF DESCRIPTION OF THE DRAWINGS

The preferred embodiments of the invention will be described below with reference to the accompanying drawing, in which like numerals refer the like members, and in which:

FIG. 1 is a front view of the inventive, composite target having four graphic patterns at which to aim;

FIG. 2 is a back view of the target of FIG. 1;

FIG. 3 is a side view of the target of FIGS. 1 and 2, showing first and second sheets and a bullet about to enter the front of the target; FIG. 4 is an enlarged view of a portion of the target of FIG. 3, showing the bullet penetrating the first sheet;

FIG. 5 is a view similar to FIG. 4, showing the bullet penetrating the second sheet;

FIG. 6 is a view similar to FIG. 5, after the bullet has passed through both sheets to expose a portion of the second sheet from the front of the first sheet;

FIG. 7 is a front view of FIG. 6, showing the high contrast color defining the hole; and FIG. 8 is an enlarged side view of another embodiment, having a third sheet behind the second sheet.

DESCRIPTION OF THE PREFERRED EMBODIMENT

FIG. 1 shows a paper target 10 including a first, substantially planar sheet 12 defining a front surface 14. The front surface 14 has printed thereon, one or more graphic patterns indicated generally as circles 16. The first sheet 12 and patterns 16 can be of conventional construction and color, e.g., a black bull's eye 16 on a white or cream colored front surface 14.

FIG. 2 shows the back of the target 10, which includes a second sheet 18 of substantially planar material, such as paper or plastic. The second sheet has a color that contrasts highly with one or both of the colors of the front side 14 or pattern 16 on the first sheet 12. In FIG. 2, the second sheet 18 is shown having a smaller area then the first sheet 12, only to illustrate the composite structure of the target; both sheets can alternatively be the same size. The second sheet 18 is connected to the first sheet 12 in any convenient manner, but a plurality of discrete connections such as staples 20 is preferred. The connection could be made by means of glue, lamination, or equivalents. The connection points shown in FIG. 2 are outside of or between the patterns 16 on the first sheet, although this is not essential.

FIG. 3 is a side view of the target 10, showing in exaggeration, that the front surface of the second sheet 18 need not be in intimate contact everywhere it confronts the back surface of the first sheet 12. This figure also shows a pellet or bullet 22 about to penetrate the target from the front of the first sheet 12.

FIGS. 4 through 7 illustrate the inventors' theory as to why a second sheet 18 made from plastic, especially polyvinyl chloride, is particularly effective to enhance hole visualization with relatively large caliber bullets. As the bullet 22 penetrates the first sheet 12, preferably paper, a certain degree of tearing occurs so as to form a hole 24. As the bullet penetrates the second sheet 18, the plastic stretches beyond its elastic limit before tearing to produce a second hole 26. After the bullet has passed through both sheets, the second sheet returns to a neutral condition, with the second hole 26 having an effective diameter 30 that is smaller than the effective diameter 28 of the first sheet 12. The high contrast color of the portion of the second sheet 18 that lies within the effective diameter of the first hole 28 significantly improves visibility of the hole to the marksman.

The polyvinyl chloride second sheet 18 ideally has a thickness in the range of about 10–30 mils, with 15–20 mils preferred. Although a variety of plastics should perform satisfactorily with large caliber bullets, the inventors have found that liner material for swimming pools is especially effective.

For use with small caliber bullets, and especially with pellets, the inventive target performs better if the second sheet 18 is paper, such as flourescent-impregnated paper. Preferably, the second sheet 18 is a heavier weight, or thicker paper than the first sheet 12. The sheets 12,18 should respond differently to the penetration of the pellets in order to produce slightly different holes. It should be appreciated that small caliber bullets or pellets do not rip large holes in either sheet as do large caliber bullets, but rather tend to puncture the sheets so as to produce ragged edges. The ragged edges of the penetrated second sheet will, however, be visible among the ragged edges of the first sheet if first and second paper sheets are held close together.

FIG. 8 shows another variation 32 suitable for small caliber bullets, wherein a third paper sheet 34 is supported immediately behind the second paper sheet 18a. The third sheet color also contrasts highly with that of the first sheet, and is preferably the same as the color of the second sheet 18a. The third sheet 34 can be connected by staples 36 or the like, to one or both of the second sheet 18 and first sheet 12.

We claim:

1. A firearms target that is capable of providing a visual colored record comprising:

a substantially planar first sheet, of paper having a back surface and an exposed front surface which carries a graphic pattern having a first color, at which a firearm is aimed;

a substantially planar second sheet, of an inelastically stretchable plastic securely and directly connected to the back surface of the first sheet so as to lie substantially parallel to the first sheet, the second sheet having a front surface that has a second, contrasting color relative to the first color;

wherein a round fired from the firearm into the graphic pattern tears the first sheet, leaving a first hole, and inelastically stretches the plastic as it tears through the second sheet, leaving a second hole that is smaller than the first hole, such that the said second contrasting colored sheet is visible within the effective diameter of the first hole and the second color is visible within the first hole when the front surface of the first sheet is viewed from a distance.

2. The target of claim 1, wherein the second sheet is made from polyvinyl chloride.

3. The target of claim 2, wherein the thickness of the second sheet is in the range of about 10–30 mils.

* * * * *